R. F. STEWARD.
METHOD OF EFFECTING CHEMICAL REACTIONS.
APPLICATION FILED AUG. 19, 1912. RENEWED JUNE 10, 1916.

1,284,488.

Patented Nov. 12, 1918.
2 SHEETS—SHEET 1.

Witnesses

Inventor

UNITED STATES PATENT OFFICE.

ROY F. STEWARD, OF WASHINGTON, DISTRICT OF COLUMBIA.

METHOD OF EFFECTING CHEMICAL REACTIONS.

1,284,488.  Specification of Letters Patent.  Patented Nov. 12, 1918.

Application filed August 19, 1912, Serial No. 715,824.  Renewed June 10, 1916.  Serial No. 103,021.

*To all whom it may concern:*

Be it known that I, ROY F. STEWARD, a citizen of the United States, residing at Washington, in the District of Columbia, have invented certain new and useful Improvements in Methods of Effecting Chemical Reactions, of which the following is a specification.

This invention relates to methods of effecting chemical reactions; and it comprises a process wherein material to be treated is centrifugally propelled as a moving film or layer in contact with a catalyst and is subjected while so moving to the action of an agent or agents capable of altering the same chemically; and it further comprises apparatus for carrying out said process.

The speed at which chemical reactions between given reacting substances proceed depends very largely upon the intimacy of contact between the reacting substances. The nearer a condition of molecular contact can be approached, the greater is the reactive tendency, and the greater also, within limits, is the reaction velocity. Obviously, in a given reaction, the larger are the areas of the reacting substances in this type of contact, the greater is the yield of the reaction product or products per unit of time. In operations involving chemical reactions, particularly in operations on a commercial scale, it is usually of primary importance that as large areas of the reacting substances be presented to each other under the conditions described as is compatible with the other practical considerations involved in the particular operations in question. These general principles are of course well recognized and it has been sought to utilize them practically in many connections. Where liquids are to be treated with gases which not only react chemically therewith but are also physically soluble therein, the desired intimacy of contact is favored to a considerable extent. But where a gas is only moderately or practically not at all soluble in the liquid with which it is desired to bring about reaction, the problem of securing molecular contact of the reacting substances in large quantities is difficult.

The foregoing considerations apply with especial force to processes of hydrogenating unsaturated liquid substances. Practically speaking, hydrogenating processes must be carried on in the presence of a catalytic or assisting agent, since without a catalyst the union of hydrogen with an unsaturated substance usually occurs very slowly, if at all. And in hydrogenating with the aid of a catalyst, the locus of the hydrogenating reaction is confined rather narrowly to the immediate vicinity of the points or surfaces of contact between the unsaturated liquid and the catalyst. Generally speaking, reduction of the thickness of liquid layer coating the catalyst and separating it from the main body of the treating gas, results in an increased rate of hydrogenation. Practically, of course, this reduction in thickness cannot be profitably carried beyond fairly definite limits easily ascertainable in practice. Naturally the surface tension of the liquid will be one of the forces limiting the extent to which the filming-out process can be carried.

By the systematic and perfectly controlled method of the present process hereinafter described, I can regulate to a nicety the thickness of a liquid film separating the catalyst from the gaseous hydrogen, and can maintain such thickness within narrow limits.

Although the process of the present invention is useful in a very broad field of operations, it is especially suitable in connection with the catalytic hydrogenation of unsaturated substances, that is, substances which lack their full possible proportion or quota of hydrogen, or whose molecules contain free and unsatisfied bonds. The new process is applicable to such compounds generally, but it is especially adapted to the hydrogenation of unsaturated fatty substances. As typical of such substances may be mentioned animal and vegetable fats and oils consisting largely of, or containing, unsaturated fatty acids, glycerids, such as cottonseel oil, olive oil, etc.; also free fatty acids, such as oleic and linoleic acids, and their esters. Liquid hydrocarbons of the olefin or acetylene series, or solutions of gaseous hydrocarbons of these series, either alone or in admixture with other hydrocarbons as they occur for instance in certain mineral oils, are examples of other materials whose treatment is contemplated in the present invention. The hydrogenation sought may be complete or only partial, depending on the products desired.

By way of illustration, and not intending thereby to limit the scope of my invention, I shall describe my process more particularly as applied to the hydrogenation of an unsaturated fat or oil as, for example, cottonseed oil, in the presence of a contact substance or catalytic. I shall also describe novel embodiments of apparatus within my invention and suitable for use in practising my process.

Cottonseed oil, in common with many other oils, contains a relatively large proportion of oleic acid, principally as the triglycerid, olein. Oleic acid and its esters are unsaturated bodies which are liquid at or near ordinary temperature. Oils and fats containing these bodies in any large proportion are therefore either liquid at ordinary temperature, or, if solid, are characterized by relatively low melting and solidifying points. Furthermore the presence of other unsaturated acids or glycerids renders them more or less unstable and apt to develop rancidity rather easily. These characteristics largely prevent their use for many purposes, notably as materials for hard soaps and candles, and, in the case of cottonseed oil particularly, as edible fats suitable as substitutes for lard, etc. By chemically adding sufficient hydrogen to cottonseed oil, however, it can be transformed from a liquid containing a large proportion of olein into a fat containing a large proportion of stearin. Similar results can be attained by hydrogenating olive oil, oleic acid *per se*, olein, etc.

The problem of thus converting unsaturated oils and fats into valuable products of higher saturation has received much attention in the past, but commercially successful methods for effecting a satisfactory solution of the problem have been lacking for the most part. While the saturating reaction is simple enough in theory, the practical difficulties attending the operation of hydrogenating an oil are considerable. Hydrogen is very bulky for its weight and is only slightly soluble in oils, so that molecular contact of the reacting substances in large quantities is not easy to attain. Furthermore since most unsaturated oils do not take up hydrogen chemically with great rapidity under ordinary circumstances even with a good catalyst present, special conditions are necessary for successful conversion.

According to the present invention the oil to be hydrogenated is treated systematically in a manner and under conditions insuring uniform, smooth and controllable reaction and saturation. I secure this result by filming the oil out centrifugally in contact with an atmosphere of hydrogen and in the presence of an assisting agent or catalyst. The method of procedure here contemplated is to be clearly distinguished from proposed methods of hydrogenation in which, for example, the oil is stirred, is sprayed into an atmosphere of hydrogen, or trickles down gravitally over catalyst carried on inert bodies. Such methods lack the accuracy of control and uniformity of results characterizing the present process. Moreover, in such processes, the output is strictly limited by the cubic capacity of the apparatuses employed.

In the present process, I may, for example, feed oil to a rapidly rotating member at a point or points more or less remote from the outer edge or periphery thereof. The oil is immediately filmed out superficially by centrifugal force and travels away from the center of rotation as a swiftly moving film or layer of relatively large expanse and of accurately controllable thickness. A forced travel of a thin layer of the oil is thus produced and maintained for a definite distance or period of time. A suitable atmosphere of hydrogen is provided in free contact with and bathing the moving film, and the portions of such atmosphere in the neighborhood of the traveling oil film are maintained in swirling or vortical agitation by the motion of the film itself which enhances the efficiency of the operation. Any desired gas pressure may be employed within the apparatus according to the nature of the substance to be treated, and this may vary from much less than atmospheric pressure to heavy plus pressure. The temperature should also be regulated, heating to a greater or less extent being ordinarily desirable where oils are to be hydrogenated. During the filming, the oil is in contact with a catalytic or accelerating agent which is best mixed in solid form or in colloidal solution with the oil, or which may be fixedly supported on the surface over which filming occurs. A large number of substances, capable of serving as hydrogen carriers, are available for this purpose, of which the following are examples: platinum, palladium, and the platinum metals generally; also nickel, cobalt, iron, copper, silver, vanadium, molybdenum, tungsten, and many other metals which exhibit catalytic properties in reactions of this kind. Salts such as potassium chlorplatinate are useful catalysts under some conditions, as are also colloidal solutions, especially of the noble metals. Labile oxids of these metals are also suitable under certain conditions, particularly where there is no objection to obtaining hydroxy compounds in the product. Of these catalysts, freshly reduced metallic nickel and platinum are ordinarily the most satisfactory in practice.

I may employ a single catalyst, or a combination or mixture of two or more, and the physical condition of the catalyst or mixture of catalysts may vary widely. A mobile condition of the catalyst is particularly desirable for the purposes of the present invention. Thus I may use the catalyst in finely-divided or pulverulent form, prepared according to any known or suitable method, and I may suspend it in or emulsify it with the oil to be treated in the typical example assumed. Other pulverulent material such as kieselguhr may also be mixed with the oil in addition to the principal catalyst and may, itself, act as an accelerating agent in the hydrogenation to some extent. Platinum black lends itself well to this suspension or emulsion method of oil-catalyst mixture, as does also finely divided nickel obtained, for example, by igniting a nitrate or an organic salt of nickel and then reducing the resulting oxid. The catalyst may also be employed in spongy condition, or it may be granular.

When an emulsion or mixture of an oil and a catalyst is centrifugally layered or filmed out from a point or points of distribution in the manner described above, every particle of the liquid is systematically exposed to the surrounding atmosphere of hydrogen in company with the loose or mobile particles of catalyst, and the maximum opportunity for rapid hydrogenation may thus be afforded in a perfectly controllable manner. For any given speed of rotation, the thickness of the centrifugally propelled layer or film of mixed oil and catalyst obviously depends upon the rate at which the mixture is fed to the rotating member. Or, for a given rate of feed, the film thickness will vary with the speed of rotation. An extremely flexible method of controlling this highly important factor is thus at hand. The thickness of the layer varies moreover at different distances from the center of rotation, decreasing outwardly from the center. This gradual thinning of the layer as it travels outward and covers an increasing area produces an internal disturbance or agitation within the body of the layer itself, causing its exposed surface to change constantly and to present fresh particles of oil and catalyst to the surrounding hydrogen in enormously rapid succession. In this way each particle or portion of catalyst may at one instant be close to the outer surface of the oil film where the hydrogen has comparatively ready access to it; and at the next instant that portion of the catalyst, carrying with it hydrogen picked up at the film surface, has moved deeper into the film. Thus the penetration of hydrogen to all parts of the oil film is facilitated by the vortical movements of the mobile catalyst. Moreover, the continual motion of the catalyst, when in pulverulent condition, results in a certain amount of rubbing or attrition of the catalytic particles against each other and against the surface over which they travel, which is effective in keeping their surfaces free from the slimy shielding layer of higher melting fatty material which may be formed as hydrogenation proceeds. This shielding layer is especially apt to be formed when hydrogenating at low temperatures, and it necessarily prevents ready access of hydrogen to the catalyst particles and lowers the operating efficiency. The mutual rubbing of the particles resulting from their centrifugally produced travel tends to keep their surfaces clean and active.

By this systematic and perfectly controllable method I can thus regulate to a nicety the thickness of the oil layer separating the catalyst from the circumambient gaseous hydrogen, and can maintain this thickness within narrow limits. Moreover a much thinner layer can be attained, where desired, than in the gravital filming and spraying methods heretofore proposed.

While I have emphasized the desirability in some cases of employing thin films of liquid in my process, it is not to be understood that films of excessive thinness are necessarily contemplated. Practical considerations set the limits to which the filming or layering can advantageously be carried. In many cases therefore, centrifugally propelled layers of relatively substantial thickness may be used while retaining the advantages of the present process and without departing from the scope of the present invention. In such cases it may be advisable to run the liquid through the process a plurality of times to insure sufficient hydrogenation. This may be accomplished by operating a number of centrifugal units in series, or by providing for repeated returns of the liquid to the distributing portion of a single unit.

Provision may be made for maintaining the reacting materials at a suitable temperature. Ordinarily it is best to heat somewhat. In treating cottonseed oil, temperatures in the vicinity of 150° C. are generally advantageous, and I find it best also to keep the hydrogen under pressure, a pressure of 5 to 10 atmospheres being often suitable. I may however operate with hydrogen at ordinary or atmospheric pressure; and for some classes of products even reduced pressure is advisable. The temperature of the operation may also vary considerably. As a rule, with higher pressures lower temperatures may be used.

The ability to work with such thin films of mixed oil and catalyst, and hence to secure substantially molecular mutual proximity of oil, catalyst and hydrogen on a large scale, renders it possible to operate with lower temperatures than would otherwise be required. This is of great importance where low temperature hydrogenation of an oil is necessary or desirable.

Instead of mixing or emulsifying the catalyst with the oil to be hydrogenated, I may dispose the catalyst fixedly on the surface of the rotatable member and film the unsaturated substance thereover. For example I may construct the rotatable member of steel or the like and plate its surface with nickel. This plating of nickel may then be oxidized in any suitable way as by heating in an oxidizing atmosphere and the oxid then reduced by hydrogen. This gives an adherent coating of finely divided metallic nickel suited to catalytic action. Other methods of depositing nickel or another catalyst on the rotatable body as a carrier therefor may of course be practised.

In some instances, instead of employing a catalyst in solid form, I may use a solution of a suitable metallic salt or a colloidal solution of a metal. Thus colloidal solutions of platinum, palladium, silver, etc., may be mixed with the substance to be hydrogenated and centrifugally layered or filmed therewith in accordance with the present invention. The colloidal metal may be separated from the finished product by salting out methods. While the catalyst may be usefully employed in the colloidal form under some conditions, I prefer ordinarily to use it in the form of finely divided metal or metallic oxid on account of lower cost, greater ease of separation from the finished product, and simpler operations generally.

The treating gas may be circulated through the reaction chamber or it may simply be supplied to the reaction chamber at atmospheric, reduced, or excess pressure, as fast as it is taken up, the reducing atmosphere being thus maintained substantially static. Circulation is to be preferred, however, where the atmosphere employed is not pure or nearly pure hydrogen as, for example, where water gas and the like are used in lieu of pure or commercially pure hydrogen. Such hydrogen-containing gas mixtures may or may not be subjected to preliminary purification before use, depending upon the nature of the materials to be treated therewith and the products to be obtained. In treating oils, as in other specific embodiments of the hydrogenating process herein disclosed, I prefer ordinarily to use a gas comparatively rich in hydrogen such as that obtained as a by-product in various electrolytic operations; in the manufacture of caustic soda and chlorin from salt, for example. Treating iron at red heat with steam is a simple and effective method of obtaining hydrogen for the purposes of the present invention. Hydrogen prepared by reacting between a metal and an acid, as between iron and sulfuric acid, is also suitable.

Another highly useful and important embodiment of my invention comprises moving a liquid to be treated and a catalytic material in opposite directions in contact with each other and in the presence of a treating atmosphere. In its broader applications this embodiment of my process does not require centrifugal propulsion of the liquid treated. But in practice, centrifugal propulsion is more desirable here also, especially since by its use a very complete and continuous separation of suspended catalyst from the liquid is readily attainable. Heretofore a separate step of filtering or otherwise separating the finely divided catalyst from the oil has ordinarily been resorted to.

In still another embodiment of my process I may feed a mixture of oil and catalyst to the smaller end of a coned centrifugal rotor, permit them to pass together as a traveling layer to the other end in the presence of hydrogen, separate the oil and catalyst either completely or to any desired degree at the discharge end, return the catalyst automatically or otherwise to the feed end, and also return all or any desired portion of the substantially clear oil or oil still containing some catalyst, to the feed end for another passage through the rotor. Or, the oil may be conveyed away from the discharge end, after one pass to any convenient place for storage or for further treatment.

In the accompanying drawings I have illustrated more or less diagrammatically various embodiments of apparatus for use in carrying out my new process. In these drawings

Figure 1:
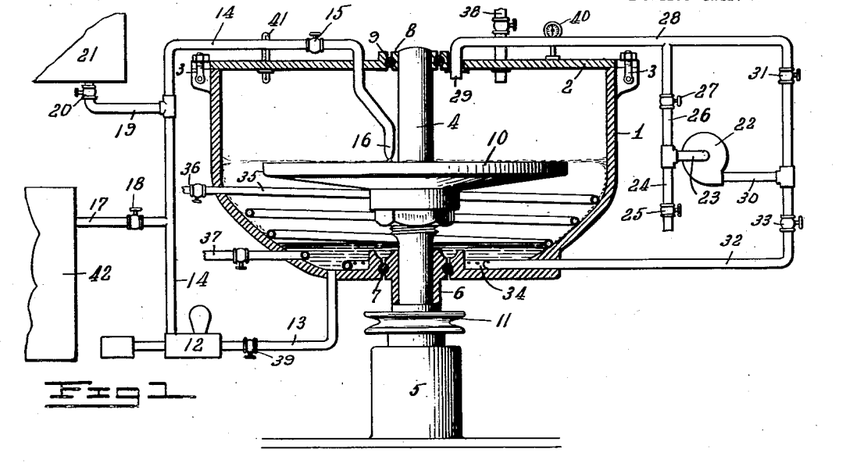
Figures 1, 2 and 3 are views in sectional elevation of different types of apparatus which may be employed.

Referring to the drawings, Fig. 1 illustrates one of the simplest types of apparatus suitable for my purposes. A suitably mounted casing 1 provided with a tightly fitting cover 2 secured thereto by any suitable means, such as bolts 3, incloses a rotatable shaft whose lower end is provided with a step bearing inclosed within the pedestal 5. This step bearing should preferably be semi-spherical in form to permit slight lateral play or swing of the shaft. A collar or sleeve bearing embraces the lower part of the shaft where it passes through the bottom of the casing 1; and gasket 7 between the sleeve and the edges of the opening through the said casing insures a tight joint therewith. A similar arrangement at the upper end of the shaft comprising sleeve bearing 8 and gasket 9 performs a similar function. Gaskets 7 and 9 are best of rubber or other yielding material to permit a slight lateral play of the shaft.

The shaft carries a plate or cylindrical disk 10 suitably secured thereto, the upper surface of the disk being best concaved or dished slightly from the periphery toward the center. The shaft may be driven by means of pulley 11 fast therewith, the source of power not being shown. Pump 12 is arranged to draw liquid from the lower part of the casing through pipe 13 and to convey the same through pipe 14, valved at 15, to nozzle 16 arranged to deliver liquid near the center of the circular disk. Or liquid may be pumped through branch 17, valved at 18, to any convenient place. Pipe 19 valved at 20 leads from supply reservoir 21 into pipe 14. Gas pump 22 is provided with an intake 23 having branch 24, valved at 25, arranged to take gas from any convenient source of supply. Another branch 26, valved at 27 connects with pipe 28, opening at 29 into the upper part of the chamber inclosed within the main casing of the apparatus.

Gas may pass from the discharge outlet 30 of the pump either into the top of the casing by way of pipe 28 and valve 31, or into the lower part of the casing by way of pipe 32, valve 33, and perforated ring 34. Steam coils 35 are provided with valved inlet 36 and valved outlet 37. Valved pipe 38 may serve as a blow-out opening.

In hydrogenating cottonseed oil for example with the apparatus just described, the disk is set in rapid rotation and oil is fed in from supply reservoir 21 through pipe 14 and nozzle 16, being discharged near the axis of rotation. The disk may or may not carry a layer of nickel or other catalytic material permanently fixed upon its upper surface. If it does not, the oil fed thereto should contain finely divided catalytic material suspended therein or emulsified therewith. In the present instance it may be assumed for purposes of illustration that an emulsion of oil and impalpably fine freshly reduced nickel is used. This mixture upon being deposited on the upper surface of the rapidly rotating disk films or layers out thereon and is forced to travel toward the periphery of the disk as an unbroken film or layer of progressively diminishing thickness. From the edges of the disk the mixture is thrown off and is dashed against the surrounding casing, collecting in the lower part of the apparatus. When a suitable amount of the liquid has thus collected, the valve 20 may be shut off and valve 39 may be opened and the liquid withdrawn and pumped through pipe 14 back to nozzle 16 to be discharged thence again upon the rotating disk or plate. This circulation of the oil-nickel emulsion may be continued as long as is necessary to effect the desired degree of hydrogenation.

During the operations above described, an atmosphere of hydrogen or comprising hydrogen is maintained within the apparatus casing. If it is not desired to circulate hydrogen through the apparatus, but if it is merely desired to supply it in static condition, hydrogen may be drawn from any suitable source by the pump 22 through pipe 24 and discharged by way of pipes 30 and 28 to the gas inlet in the cover of the apparatus. With this arrangement the pump supplies hydrogen only as fast as the oil takes it up, and any desired degree of pressure may be maintained, such pressure being indicated conveniently by gage 40. If, on the other hand, it is desired to circulate hydrogen through the apparatus, this may be done for example by opening valves 27 and 33 and closing valve 31, when the pump will take gas through pipe 26 from the top of the casing and will force it through pipe 32 into the perforated ring at the bottom. Valve 25 may be arranged to open, when the pressure within the casing falls during the circulation below the desired point, to take in additional quantities of hydrogen to replace that absorbed by the oil. By observing the indications of thermometer 41 and suitably manipulating the valves governing the inlet and outlet of the steam coils, the proper temperature regulation is easily attained. Instead of a single rotating disk or plate, a plurality of such disks may be arranged within a single casing, and each disk may have its individual supply nozzle or other means of oil supply. Or stationary return baffles or the like secured to the casing may be arranged so that after the oil is discharged from the uppermost of a series of disks it may be conveyed to near the center of the next succeeding disk and so on through the series. This arrangement is sufficiently obvious and does not require further description in detail.

It is to be noted that in the procedure described, oil mixed with a catalyst, or in contact with a catalyst, is forced to travel as a free surfaced layer or film fully exposed at all points to the hydrogen or hydrogen-containing atmosphere in the treating chamber.

Where I treat a mixture of an unsaturated oil and a pulverulent catalyst in an apparatus like that of Fig. 1 for example, the particles of catalyst may be separated from the oil after hydrogenation in various ways as by filterpressing or by centrifuging. If a catalyst comprising nickel, iron, cobalt or other magnetic metal is employed, the separation may conveniently be accomplished magnetically. Thus I may pump the oil-catalyst mixture from the hydrogenating chamber into a suitable tank 42 and then immerse or dip a strong electromagnet in the mixture. The particles of magnetic metal attach themselves to the magnet and to each other and may be withdrawn in a mass from the bulk of the oil with the magnet when the latter is removed from the tank. After removal form the magnet the catalyst may be pressed or otherwise treated to remove most of the adhering oil, and may then be mixed with untreated oil and returned to the process. With nickel or cobalt a stronger magnet should be used than where iron is the catalyst, since nickel and cobalt are much less magnetic than iron.

This magnetic method of separation has distinct advantages in treating oil-catalyst mixtures of the type just described. Using catalytic nickel, for example, in a state of almost impalpably fine subdivision, filtering methods are often hardly practicable and even centrifugal separation of the minute metal particles from such mixtures is sometimes attended with more or less difficulty. The method here disclosed avoids the stated difficulties and is rapid and efficient.

Figure 2:
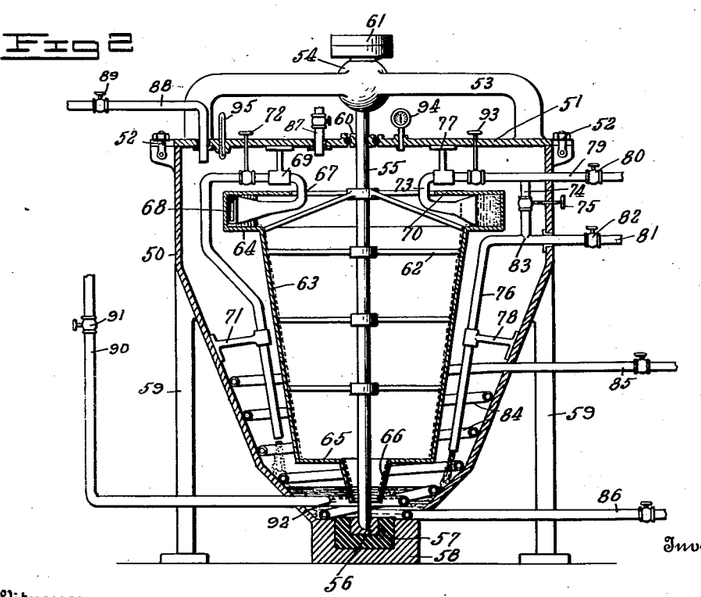

In Fig. 2 is illustrated a type of apparatus especially convenient to employ with emulsified mixture of liquid and catalysts. A casing 50 is provided with a cover 51 tightly secured thereto as by bolts 52. Yoke member 53 provides a suitable bearing 54 for shaft 55 journaled at its lower end in step bearing 56 which may be embedded in a block 57 of elastic material, such as rubber, the whole being carried by a base 58. The step bearing may of course be of different design from that shown, and may be differently located. Thus, for example, the rotor shaft may project through the bottom of the hydrogenating chamber and the step bearing may be located entirely outside of said chamber, a suitable stuffing box being provided to insure a tight joint where the shaft passes through the wall of the chamber. This arrangement is in some instances preferable to that shown in the drawings.

A supporting framework 59 may be provided to increase the stability of the apparatus. A yielding gasket 60 of rubber or the like arranged in the cover of the apparatus permits slight lateral play of the shaft. The shaft is provided with pulley 61 taking power from a source not shown. The shaft carries spider arms 62 to which is secured a rotor having slightly coned sides 63 and provided at its upper portion with annular channel or trough 64. The bottom 65 is provided with a hollow conical projection 66 whose lower edges extend to near the bottom of the apparatus casing. Curved pipe 67 extends to within a short distance of the outer wall of the annular trough before mentioned and terminates near said wall in opening 68. This pipe is supported by bracket 69 secured to the cover and extends through the circular central opening formed by the inner edges of wall 70 forming the upper boundary of the annular trough. Pipe 67 passes thence outwardly and downwardly between the rotor and the casing walls and discharges at any convenient point below bracket 71 provided to support the lower part of this pipe. Valve 72 provides means of governing the flow of material through this pipe. Instead of being rigidly supported, the pipe 67 may be adjustably held in place so that the distance of the opening 68 from the bottom of the trough may be varied if desired.

Another pipe 73 generally similar in arrangement to pipe 67 is also provided, and has an opening (not shown) facing in the same circumferential direction as opening 68. This latter pipe is however arranged to open into the trough at a greater distance from the periphery thereof than is pipe 67. Pipe 73 discharges through branch 74 valved at 75 and pipe 76 into the lower part of the apparatus, the piping being supported as by brackets 77 and 78. Pipe 73 also has an extension 79, valved at 80, leading to any convenient place of discharge. Feed pipe 81, valved at 82, unites with pipe 76 at 83. Steam coils 84 are provided with valved inlet 85 and valved outlet 86. Valved pipe 87 may serve as a blow-off outlet. Pipe 88 valved at 89 opens into the upper part of the casing and serves as a gas inlet or outlet. Gas may also be introduced into the lower part of the apparatus by way of pipe 90 valved at 91 and terminating in perforated ring 92.

In carrying out the process with the type of apparatus shown in Fig. 2, a mixture of oil and catalyst is introduced through pipe 81 and is discharged into the lower part of the casing through pipe 76. The rotor having been set in rapid rotation, the mixture of liquid and catalyst is drawn up by centrifugal force through coned projection 66 and spreads over the rotor walls in the form of a layer traveling upwardly, the catalyst, finely divided nickel for instance, forming a layer next to the rotor walls while the oil being lighter forms a film or layer slightly spaced away from the walls by the catalytic material. Both these layers however travel upwardly and are discharged into the annular channel or trough, the metal catalyst collecting in a more or less compact layer at the bottom of the trough and the oil forming another layer closer to the axis of rotation. As the openings in pipes 67 and 73 are arranged in opposition to the direction of rotation, the catalyst is collected or scooped up by pipe 67 and is propelled therethrough around outside the rotor and discharged into the lower part of the casing. Similarly pipe 73 collects oil substantially free from catalyst and returns the same through pipe 76 to the lower part of the casing. Or if the conditions of operation are such that one passage of the oil over the inner surfaces of the rotor is sufficient, the hydrogenated product may be discharged directly through pipe 79 to any convenient place of use, valve 75 being then of course closed. Valve 93 controls the flow of oil through pipe 73. The prevailing pressure and temperature may be observed by gage 94 and thermometer 95.

The pumps for supplying oil and hydrogen are not illustrated in the showing of Fig. 2, but they may be similar in character and in piping connections to those shown in Fig. 1.

Figure 3:
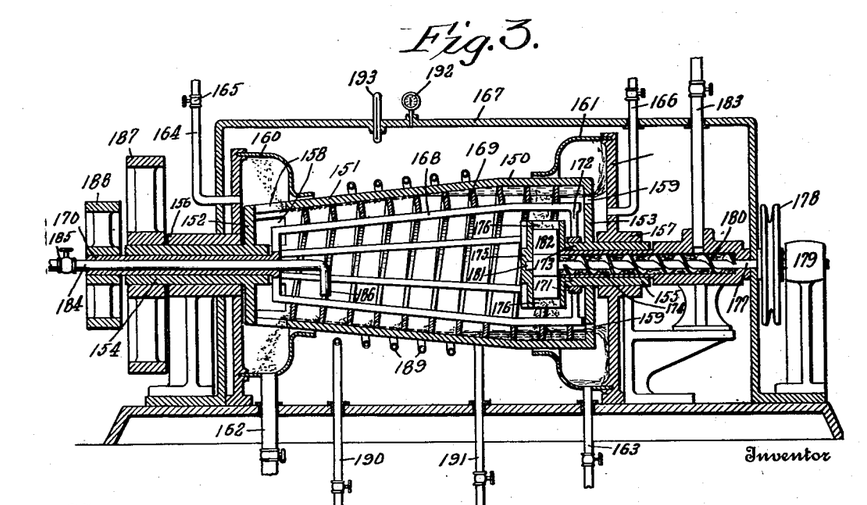

In Fig. 3 is shown apparatus wherein the liquid and catalyst may be caused to travel in mutual contact in opposite directions in an atmosphere of the gas with which the liquid is to be treated. A rotor having a cylindrical portion 150 and a coned portion 151, has end walls 152 and 153, and is carried by hollow shafts 154—155 journaled at 156 and 157 respectively. At the smaller end of the coned portion are provided openings 158 for the discharge of solids, while openings 159 for discharging liquid are provided in end wall 153 at a suitable distance from the outer periphery thereof. Annular receiving troughs 160 and 161 are provided for solids and liquids respectively, and these troughs have valved draw-off pipes 162 and 163 respectively. Inlet pipe 164 valved at 165 serves to convey hydrogen or other gas into trough 160 and thence into the rotor while a similar pipe 166 may serve the same purpose, or may serve as a gas outlet. Casing 167 surrounds the rotor and other principal portions of the apparatus, and should be gas tight.

Within the coned rotor above described is arranged rotatable frame 168 carrying helically disposed scraper blades 169 whose outer edges are arranged in close proximity to the rotor walls. To one end of this frame is secured hollow shaft 170 arranged within shaft 154. The opposite end of the frame is carried by a collar 171 secured to arms 172 and bearing upon a cylindrical sleeve 173 carried by the wall 153 of the rotor.

Within cylindrical sleeve 173 is arranged stationary feed tube 174 which projects within the rotatable frame and carries distributing member or box 175 having peripheral openings 176. Within the tube is arranged rotatable shaft 177 carrying pulley 178 arranged outside the casing, the shaft being journaled at 179. This shaft carries conveyer screw 180 and is journaled at its opposite end at 181 in the distributing member. Distributing vanes or paddles 182 are carried by shaft 177 and are arranged for rotation within the distributing member. Valved pipe 183 is arranged to convey catalyst to the conveyer screw within the stationary tube. Pipe 184 valved at 185 passes axially through hollow shaft 170 and has a discharge nozzle 186, whereby liquid may be supplied to the coned rotor at a point somewhat to the right of discharge openings 158 for solids.

The rotor may be driven by any suitable source of power through pulley 187 keyed to shaft 154, while the shaft carrying the helical scraper blades may be driven at a different rate of speed through pulley 188 fast with shaft 170. Steam coils 189 having inlet and outlet pipes 190 and 191 are provided for maintaining the proper degree of heat. Pressure and temperature may be observed at 192 and 193. A suitable gas pump (not shown) may draw gas from any suitable source and force the same into the apparatus through pipe 165, or the pump may be arranged to circulate a body of gas through the apparatus, the gas entering at 165 for example and being withdrawn through 166 after passing through the rotor. An arrangement of gas piping similar to that shown in Fig. 1 is suitable.

A suitable pump (not shown) may deliver oil through pipe 184 and withdraw it through pipe 163 for repeated circulation through the apparatus; or the oil may be withdrawn to any convenient place of use through pipe 163 after a single pass through the apparatus.

Assuming the apparatus of Fig. 3 to be used for hydrogenating oils with the aid of granular pumice, petroleum coke, or the like carrying deposited thereon metallic nickel, platinum, or other suitable metal, oil is fed in through nozzle 186 against the coned walls of the rapidly rotating rotor, and flows toward the larger end of the rotor as a traveling film or layer against catalytic material moving in the opposite direction. It is better in this instance that the catalytic, such as finely divided nickel, be employed on a granular carrier, such as particles of petroleum coke, since very finely divided metal alone might tend to pack in a solid mass against the rotor walls and be difficult for the helical scrapers to move. In the present instance, petroleum coke is eminently suited since it possesses a convenient density for my purposes and since furthermore it has in itself some virtue as a catalyst. The coke may be broken or crushed and then screened to uniform size, after which the mass is impregnated with a salt of nickel or other metal, ignited and the oxid reduced with hydrogen. The use of a coke carrier also has advantages over a mineral carrier such as kieselguhr, pumice, etc., in that with coke, when the activity of the catalyst lessens or ceases, the catalyst is far more easily recovered than where inert mineral carriers are employed. The catalytic material thus prepared is fed to the conveyer screw 180 through pipe 183 and is distributed at the large end of the rotor by means of the rotating distributing blades or vanes. The helical conveyer blades carried by the frame are rotated at a speed different from that of the rotor and in a direction such that the granular catalytic material is moved to the left or toward the smaller end of the coned rotor against the flowing film or layer of oil. At the larger end of the rotor, the oil collects in a layer whose depth is equal to the distance of the orifices 159 from the outer or peripheral wall of the rotor, and is continuously discharged into trough 161. The catalytic material in the meantime is caused to move toward the small end of the rotor as before stated, and is discharged through openings 158 into the trough 160.

As is apparent from the drawings, during about the latter half of its travel, the catalytic material is in contact with only a relatively thin layer of oil. During the last portion of its travel, that is, between the point at which the oil is supplied to the rotor walls and the point at which the catalytic material is discharged from the rotor, practically a complete separation of the oil from the catalytic material is attained, the oil being centrifugally drained from the catalytic material while the latter is moved along the inner surface of the rotor toward the discharge outlets 158. Of course this separation is not absolutely complete, nor is perfect separation desirable. It is advantageous that a certain amount of oil be left adhering to the catalytic in order that the catalytic may be thoroughly protected from any oxidizing influence to which it may be accidentally exposed.

After being discharged into the trough 160 the catalytic material is withdrawn in any convenient way as through outlet conduit 162 and is conveyed to any convenient place of storage to be returned to the apparatus through conduit 183. The catalytic is thus used repeatedly until its activity is so far reduced as to render renewal necessary.

As before stated, the oil may be repeatedly circulated through the rotor; or if a single pass is sufficient it may be used as it comes directly from the trough 161.

Instead of locating the hydrogen inlet and outlet pipe as shown in Fig. 3, they may, by suitable alteration in design, be arranged to enter the rotor axially from opposite ends in a manner similar to the arrangement of the oil inlet pipe 184. The apparatus as shown in this figure is arranged with its axis horizontal; but with slight changes the apparatus may be adapted to operate equally well with its axis vertical, and in this case means may be provided for gravitally returning the centrifugally separated catalytic material to the lower end of the apparatus.

The inner walls of the rotors shown in Figs. 2 and 3 may of course be plated or otherwise supplied with a coating of catalytic material affixed thereto, if desired, although this is not usually necessary.

It is to be understood that the present process applies not only to unsaturated liquids *per se*, but also to solutions of such liquids in solvents not affected by the hydrogenation. Thus in some instances, where it is desirable to control the degree of hydrogenation within narrow limits, it is sometimes desirable to dilute the oil to be hydrogenated with an inert solvent which may or may not be separated from the oil after the hydrogenating process.

While the present process is of particular utility in connection with the hydrogenation of unsaturated substances it may also be employed in analogous processes involving the catalytic treatment of various liquid or liquefiable materials with gases other than hydrogen. For example, the new process may be usefully employed in oxidizing oils, such as linseed oil, for varnishes, etc., the oil being centrifugally filmed or layered out in an atmosphere of oxygen and in the presence of accelerating agents, such as metallic oxids and the like. In the catalytic chlorination, bromination, nitration, sulfitation, etc., of many organic liquids including fatty acids, alcohols, etc., the process may also be employed with good results, the apparatus in such cases being of course built of materials adapted to withstand the chemical action of the reagents employed.

In connection with my process as above described, I may also use various other means of accelerating the desired reactions as for instance by employing electrical discharges or strongly actinic light rays (*e. g.* light from mercury vapor lamp) to increase the speed of reaction.

I do not claim herein the novel types of apparatus which I have disclosed, the same being hereby expressly reserved for the subject matter of a separate application.

What I claim is:

1. The process of hydrogenation which comprises centrifugally propelling a fluent mixture of an unsaturated substance and a catalyst as a traveling film or layer in the presence of hydrogen.

2. The process of hydrogenation which comprising centrifugally propelling a liquid comprising an unsaturated substance as a traveling film or layer admixed with a catalyst and subjecting such traveling layer to treatment with hydrogen under pressure.

3. The process of hydrogenation which comprises centrifugally filming or layering a fluent mixture comprising an unsaturated oil or fat admixed with a catalyst, and simultaneously treating said mixture with hydrogen.

4. The process of hydrogenation which comprises centrifugally filming or layering a fluent mixture comprising an unsaturated fatty acid or a derivative thereof and finely divided catalyst, and simultaneously treating the filmed mixture with hydrogen.

5. The process of hydrogenation which comprises centrifugally filming or layering a heated fluent mixture comprising an unsaturated fatty acid or a derivative thereof and a finely divided catalyst, and simultaneously treating the mixture with hydrogen under pressure.

6. The process of hydrogenation which comprises centrifugally propelling a layer of an unsaturated fat or oil in contact with a pulverulent catalyst and in the presence of hydrogen, and centrifugally separating the oil or fat from the catalyst, the propulsion of the oil as a layer in contact with the catalyst and the subsequent separation occurring as substantially continuously successive operations.

7. The process of treating unsaturated substances which comprises feeding a fluent mixture comprising an unsaturated substance and a catalyst to a rapidly rotating surface at a point relatively near the axis of rotation of such surface, and permitting said liquid to travel as a film or layer to portions of said rotating surface more remote from said axis, such travel occurring in the presence of a reacting gas.

8. The process of hydrogenation which comprises feeding a fluent mixture comprising an unsaturated substance and a catalyst to a rapidly rotating surface at a point relatively near the axis of rotation of such surface, and permitting said liquid to travel as a film or layer to portions of said rotating surface more remote from said axis, such travel occurring in the presence of hydrogen.

9. The process of treating unsaturated substances which comprises feeding a liquid comprising an unsaturated substance to a rapidly rotating surface at a point relatively near the axis of rotation of such surface, and permitting said liquid to travel as a film or layer to portions of said rotating surface more remote from said axis, such travel occurring in contact with a freely movable catalyst, and in the presence of a reacting gas, and effecting substantially complete centrifugal separation of said liquid from said catalyst by the rotation of said surface.

10. The process of hydrogenation which comprises feeding an unsaturated oil or fat in liquid form to a rapidly rotating member at a point relatively near its axis of rotation, permitting said oil or fat to be propelled centrifugally to a portion of said member more remote from said axis in contact with suitable pulverulent catalytic material and in the presence of hydrogen, and separably removing the catalyst and substantially clear oil from said rotating member.

11. The process of hydrogenation which comprises feeding an unsaturated oil or fat in liquid form to a rapidly rotating member at a point relatively near its axis of rotation, permitting said oil or fat to be propelled centrifugally to a portion of said member more remote from said axis in contact with suitable pulverulent catalytic material and in the presence of hydrogen, separately removing the catalyst and substantially clear oil from said rotating member, and again feeding the catalyst to said rotating member in admixture with oil.

12. In the hydrogenation of oils and fats, the process which comprises producing a forced travel of a thin layer of such a fat or oil in the presence of hydrogen and of a suitable pulverulent catalyst.

13. In the hydrogenation of oils and fats, the process which comprises producing a forced travel of a thin layer of such a fat or oil between a layer of catalyst in a mobile condition and an atmosphere of hydrogen.

14. In the hydrogenation of fats and oils, the process which comprises producing a forced travel of a thin layer of such a fat or oil between a moving layer of catalyst and an atmosphere of hydrogen.

15. In the hydrogenation of fats and oils, the process which comprises producing a forced travel of a thin layer of such a fat or oil between a layer of catalyst in a mobile condition and an atmosphere of hydrogen, said hydrogen being maintained in swirling agitation above said thin layer.

16. In the hydrogenation of fats and oils, the process which comprises repeatedly passing a portion of fat or oil as a forced traveling thin layer in contact with a mobile catalyst in the presence of hydrogen.

17. The process of treating materials with gases which comprises centrifugally filming or layering the material to be treated in a substantially liquid or fluent condition in the presence of a treating gas and in contact with a catalyst in mobile condition.

18. The process of hydrogenating oily materials which comprises centrifugally filming or layering such a material in fluent condition in an atmosphere comprising hydrogen and in contact with a mobile carrier of hydrogen.

19. The process of hydrogenating oily materials which comprises centrifugally filming or layering such a material in fluent condition in an atmosphere comprising hydrogen and in contact with finely divided nickel in mobile condition.

20. The process of hydrogenation which comprises establishing a traveling layer of a mixture comprising unsaturated fatty material and catalytic particles in the presence of hydrogen, and forcing the travel of said layer in such manner as to produce attrition or rubbing of said particles whereby their surfaces are cleansed.

21. The process of treating unsaturated substances which comprises feeding a liquid comprising an unsaturated substance to a rapidly rotating surface at a point relatively near the axis of rotation of such surface, and permitting said liquid to travel as a film or layer to portions of said rotating surface more remote from said axis, such travel occurring in contact with a freely movable catalyst, and in the presence of a reacting gas.

22. The process of treating unsaturated substances which comprises producing a forced travel of such a substance in the form of a free-surfaced film or layer in the presence of a reacting gas bathing the free surface of such film or layer and in the presence of a suitable catalyst, the surface of the film remaining free through the period of exposure to said reacting gas and catalyst.

23. The process of treating substances with gases which comprises centrifugally propelling a fluent substance as a free-surfaced traveling film or layer in contact with a catalyst, and simultaneously exposing the free surface of said film or layer to a body of treating gas under reacting conditions, the surface of the film remaining free throughout the period of exposure to said treating gas and catalyst.

24. The process of hydrogenating unsaturated fatty material which comprises centrifugally propelling a fatty material in fluent condition as a free-surfaced film or layer in contact with a catalyst and in an atmosphere comprising hydrogen, the surface of the film remaining free throughout the period of exposure to said atmosphere and catalyst.

In testimony whereof, I affix my signature in the presence of two subscribing witnesses.

ROY F. STEWARD.

Witnesses:
   C. W. FOWLER,
   G. MANNING.